United States Patent
Yi et al.

(10) Patent No.: US 9,860,887 B2
(45) Date of Patent: Jan. 2, 2018

(54) METHOD AND APPARATUS FOR CONTROLLING DATA IN WIRELESS COMMINICATION SYSTEM

(71) Applicant: LG ELECTRONICS INC., Seoul (KR)

(72) Inventors: Yunjung Yi, Seoul (KR); Joonkui Ahn, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/785,680

(22) PCT Filed: Apr. 22, 2014

(86) PCT No.: PCT/KR2014/003508
§ 371 (c)(1),
(2) Date: Oct. 20, 2015

(87) PCT Pub. No.: WO2014/175638
PCT Pub. Date: Oct. 30, 2014

(65) Prior Publication Data
US 2016/0095093 A1   Mar. 31, 2016

Related U.S. Application Data

(60) Provisional application No. 61/815,238, filed on Apr. 23, 2013, provisional application No. 61/819,528,
(Continued)

(51) Int. Cl.
*H04W 72/04* (2009.01)
*H04L 5/00* (2006.01)
(Continued)

(52) U.S. Cl.
CPC ........... *H04W 72/042* (2013.01); *H04L 5/001* (2013.01); *H04L 5/0053* (2013.01); *H04L 5/14* (2013.01);
(Continued)

(58) Field of Classification Search
None
See application file for complete search history.

(56) References Cited

U.S. PATENT DOCUMENTS

| 2013/0044664 A1 | 2/2013 | Nory et al. |
| 2013/0194931 A1* | 8/2013 | Lee .................. H04L 5/0053 370/241 |

(Continued)

FOREIGN PATENT DOCUMENTS

| KR | 10-2011-0134305 | 12/2011 |
| WO | 2012/045200 | 4/2012 |

OTHER PUBLICATIONS

Intel Corporation, "EPDCCH impact on UE demodulation performance—EPDCCH test scenarios". R4-131322, 3GPP TSG-RAN WG4 Meeting #66bis, Chicago, USA, Apr. 15, 2013.
(Continued)

*Primary Examiner* — Kodzovi Acolatse
(74) *Attorney, Agent, or Firm* — Dentons US LLP

(57) ABSTRACT

A method for and apparatus for controlling data transmission in a wireless communication system is provided. A wireless device acquires information including a monitoring subframe configuration, which is a subset of subframes including that control information are transmitted; determines monitoring subframes of a cell based on the information; detects control information for the data transmission according to the monitoring subframes; and rate matches data in a corresponding subframe with the detected control information.

11 Claims, 10 Drawing Sheets

Related U.S. Application Data filed on May 3, 2013, provisional application No. 61/821,691, filed on May 9, 2013.

(51) Int. Cl.
    *H04L 5/14*     (2006.01)
    *H04W 76/04*     (2009.01)
    *H04W 72/12*     (2009.01)
    *H04W 28/22*     (2009.01)

(52) U.S. Cl.
    CPC ......... *H04W 76/046* (2013.01); *H04L 5/0073* (2013.01); *H04W 28/22* (2013.01); *H04W 72/12* (2013.01)

(56) References Cited

U.S. PATENT DOCUMENTS

| | | | | |
|---|---|---|---|---|
| 2013/0242904 A1* | 9/2013 | Sartori | .................. | H04L 5/0053 370/329 |
| 2013/0242947 A1* | 9/2013 | Chen | ..................... | H04W 72/04 370/335 |
| 2013/0250882 A1* | 9/2013 | Dinan | ............... | H04W 72/0426 370/329 |
| 2013/0272170 A1* | 10/2013 | Chatterjee | ............. | H04W 28/02 370/280 |
| 2014/0098732 A1* | 4/2014 | Chen | .................. | H04W 72/042 370/312 |

OTHER PUBLICATIONS

Qualcomm Incorporate, "Further discussion on ePDCCH demodulation test", R4-131297, 3GPP TSG-RAN WG4 #66BIS Chicago, Apr. 15, 2013.

\* cited by examiner

METHOD AND APPARATUS FOR CONTROLLING DATA IN WIRELESS COMMINICATION SYSTEM

This application is a National Stage Application of International Application No. PCT/KR2014/003508, filed Apr. 22, 2014, and claims the benefit of U.S. Provisional Application No. 61/815,238 filed Apr. 23, 2013, 61/819,528 filed May 3, 2013, and, 61/821,691 filed May 9, 2013, all of which are hereby incorporated by reference in their entirety for all purposes as if fully set forth herein

TECHNICAL FIELD

The present invention relates to wireless communications, and more particularly, to a method and apparatus for controlling data transmission in a wireless communication system consisting of multiple carriers over single frequency or multiple frequencies.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted or eliminated controls and RS signals, and further UE's operation in a small cell cluster environment needs to be defined. The efficient operation includes proper monitoring and data rate-matching for small cells and macro cell.

DISCLOSURE

Technical Problem

The present invention provides a method and apparatus for controlling data transmission in a wireless communication system.

The present invention also provides a method and apparatus for rate matching data in a wireless communication system.

Technical Solution

In an aspect, a method for controlling data transmission in a wireless communication system is provided. The method may include acquiring information including a monitoring subframe configuration, which is a subset of subframes including that control information are transmitted; determining monitoring subframes of a cell based on the information; detecting control information for the data transmission according to the monitoring subframes; and rate matching data in a corresponding subframe with the detected control information.

The method may further include checking a number of subframes which is scheduled without control information for the data transmission; determining a valid subframe among the number of subframes to be applied with predetermined control information; and rate matching data in the valid subframe with the predetermined control information. Wherein the predetermined control information is configured in order of priority of cross-subframe scheduling or multi-subframe scheduling with an ePDCCH set, or a Semi-Persistent Scheduling (SPS), the priority of the control information scheduling is changed by a signal from a network, the valid subframe is changed by a carrier type of the subframe.

In another aspect, a wireless device for controlling data transmission in a wireless communication system is provided. The wireless device comprises: a radio frequency (RF) unit for transmitting and receiving a radio signal; and a processor operatively coupled to the RF unit, wherein the processor is configured for: acquiring information including a monitoring subframe configuration, which is a subset of subframes including that control information are transmitted; determining monitoring subframes of a cell based on the information; detecting control information for the data transmission according to the monitoring subframes; and rate matching data in a corresponding subframe with the detected control information.

Advantageous Effects

The proposed embodiment supports more efficient monitoring timing and data rate matching with dynamic options by small cell and macro cell conditions. Especially, the proposed embodiment supports to control rate matching for data channel with ePDCCH set, and multi subframe or cross scheduling subframe with priority in a small cell and a macro cell environment.

MODE FOR INVENTION

Figure 1:
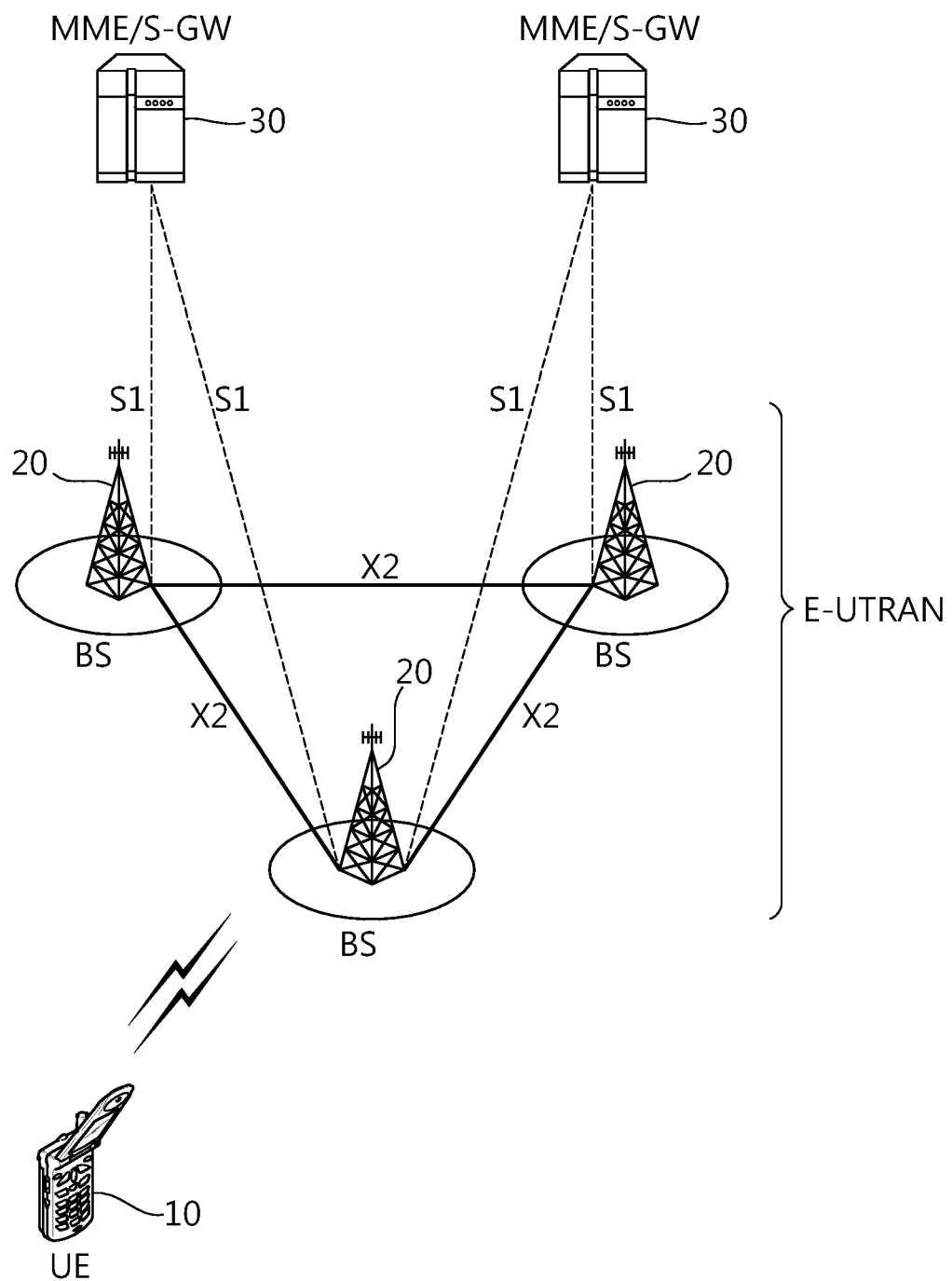
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) explains. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
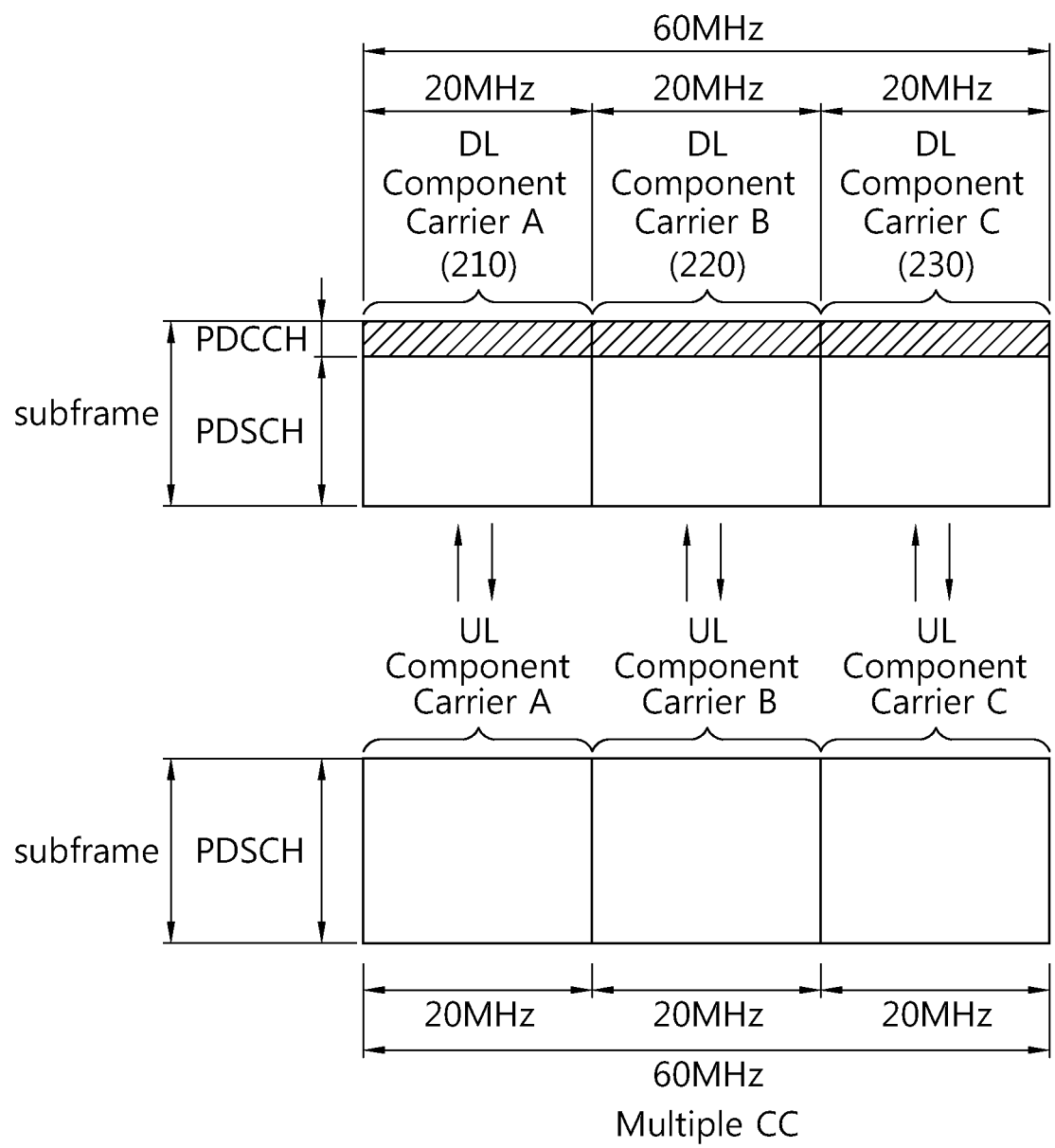
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a Pcell (primary serving cell) is a resource in which the UE initially establishes a connection (or a RRC connection) among several serving cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (secondary serving cell) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
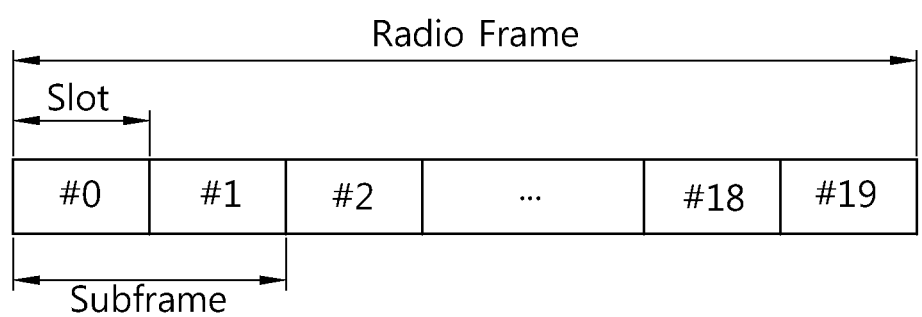
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain. The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Figure 4:
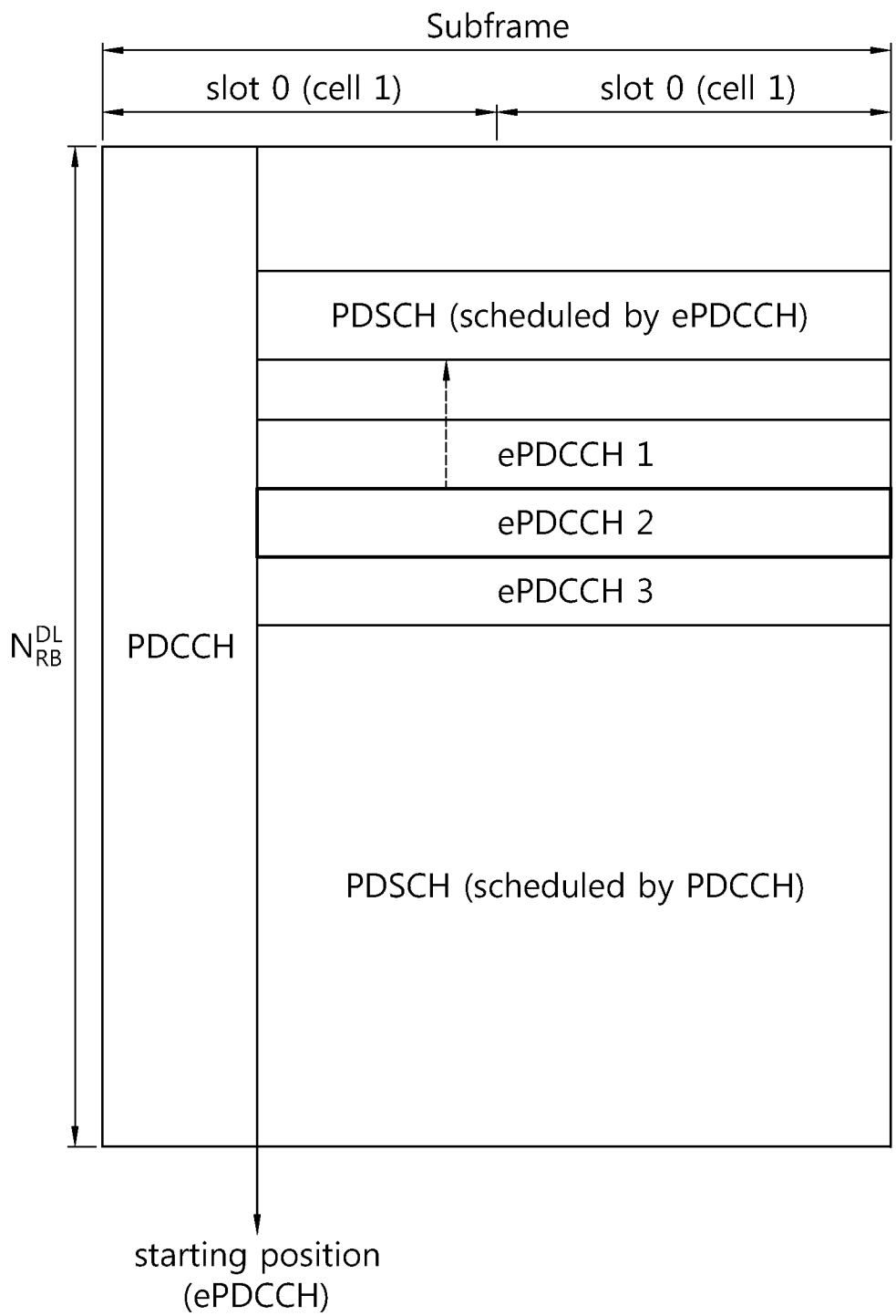
FIG. 4 shows downlink control channels to which the present invention is applied.

Herein, an ePDCCH can be one of solutions of limitation for a PDCCH transmission or new control information transmission of near future commination system including a new type of carrier as shown in FIG. 4. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted.

For this next LTE system or enhanced communication system, this proposed embodiment provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. More details, this invention considers cases where cell-specific RS used for tracking and the Radio Resource Management (RRM) measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off transmissions upon no active UE attached or based on a pattern. If this is assumed, this invention shows an example where PSS/SSS/CRS or a discovery signal based on CSI-RS is transmitted every T msec with a predetermined value e.g., T=200, or more than 200.

This proposed embodiment also supports an efficient transmission within a small cell cluster. More specifically, a dual connectivity for data flow and macro/small cell carrier-aggregation (CA), inter-site CA, or UE is connected to a small cell which belongs to a small cell cluster assuming a dense small cell deployment is supported. This proposed embodiment also discusses techniques to handle ICIC (Inter-cell interference coordination) in small cell scenarios and propose a new cell selection criteria. The scenarios considered in this invention mostly assume that macro and small cell layer use different frequency such as 2.6 Ghz and 3.5 Ghz respectively and small cell layer has wide band carriers such as 5×20 Mhz consecutive carriers. This invention thus mainly focuses on the interference coordination among small cells rather than between macro and small cell layer.

Figure 5:
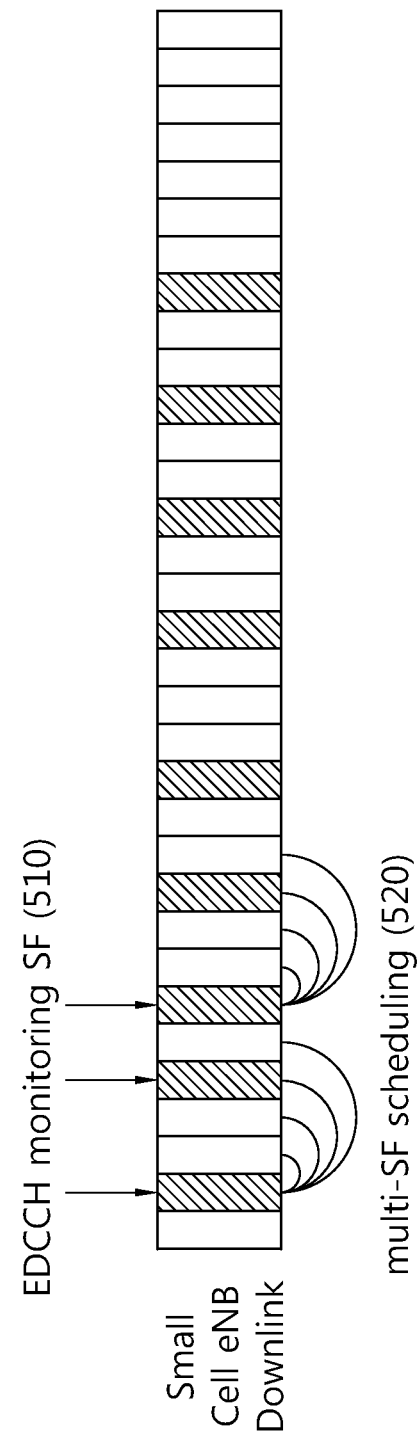
FIG. 5 shows an example of rate-matching with monitoring subframe configuration which the present invention is applied.

This embodiment shows PDSCH rate matching issues related to multi-subframe or cross-subframe scheduling where a DCI can be placed in cross-subframe for PDSCH or PUSCH other than currently-defined timing, e.g., 0 for PDSCH and −4 for PUSCH in FDD. FIG. 5 shows an example of rate-matching with monitoring subframe configuration which the present invention is applied.

Firstly, this embodiment includes various options of rate matching in case that PDSCH is scheduled by EPDCCH only. When a multi-subframe or a cross-subframe scheduling is used (520), in terms of PDSCH resource scheduled by the DCI can be changed or assumed to be the same. Rate matched PRBs for PDSCH in a subframe which is scheduled by cross-subframe, for this, multiple options can be considered. Hereinafter, this PDSCH as (E)PDCCH-less PDSCH means that DCI is not in the same subframe, rather scheduled by a DCI in different subframe.

Figure 6:
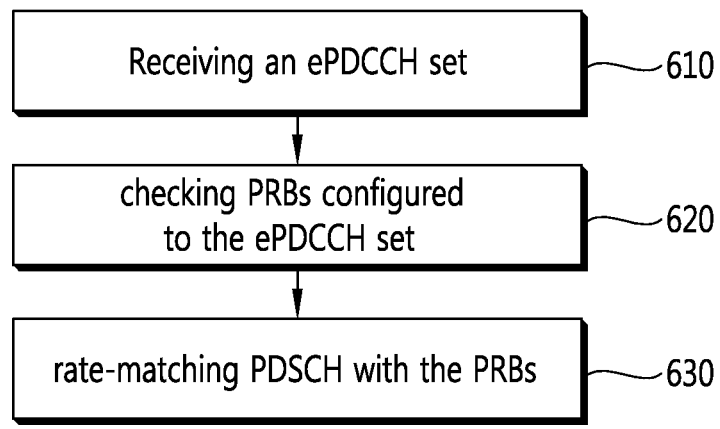
FIG. 6 to FIG. 9 show examples of rate-matching which the present invention is applied.

As Option 1 of rate matching, it shows that the (E)PDCCH-less PDSCH is always rate matched around PRBs configured to an ePDCCH set (510) which is indicated by either scheduling DCI or the ePDCCH set containing the scheduling DCI, or higher-layer signaled. More specifically, the condition can be further constrained to the case where ePDCCH set is a distributed ePDCCH set. As Option 2, it shows that the (E)PDCCH-less PDSCH is always rate matched around PRBs configured to the first ePDCCH set or the second ePDCCH set. It can be extended that always (E)PDCCH-less PDSCH is rate matched around PRBs configured to any ePDCCH set if two sets are configured, rate matched around two sets. Herein, the condition can be further constrained to the case where ePDCCH set is a distributed ePDCCH set. For Option 3, it shows that the (E)PDCCH-less PDSCH in the same subframe, i.e., scheduled by a cross-subframe DCI or by SPS, is always not rate matched around PRBs configured to an ePDCCH set. As described, this embodiment shows that the UE checks whether an ePDCCH set is received or not to perform rate matching of an (E)PDCCH-less PDSCH (610) in FIG. 6. The FIG. 6 shows an example of rate-matching with ePDCCH set which the present invention is applied. The ePDCCH set is indicated by a RRC signaling or, scheduling DCI. Then the UE checks PRBs according to the ePDCCH set (620) and performs the rate matching with PRBs on the PDSCH with the checked PRBs (630). In this invention, the UE can apply the rate matching with a cross-subframe DCI when the ePDCCH set is not configured, for corresponding subframes.

Further, in case of Option 4, it shows that a PDSCH scheduling DCI may contain the PRBs rate matched which will be assumed through PDSCH transmissions over cross-subframe or multi-subframes, in other words, always PDSCHs without PDCCH are rate matched around PRBs in which the UE has detected the scheduling DCI.

As Option 5, it shows the same PRBs rate matched in the most recent PDSCH transmission with the same type of subframe, i.e., either ePDCCH monitoring subframe or PDCCH monitoring subframe to the current subframe type. For example, PDSCH with a DCI via ePDCCH and rate matched in the overlapped PRBs are assumed to be rate matched in the current SPS PDSCH.

For CSS ePDCCH for both PDSCH is scheduled by a DCI or PDSCH scheduled by cross-subframe DCI, it includes that PDSCH is rate matched around PRBs configured to ePDCCH set(s) assigned to CSS. Or PDSCH may not be rate matched around CSS ePDCCH set(s), or PDSCH is rate matched only when the UE detects DCI in CSS ePDCCH set(s) on PRBs where CSS DCI and PDSCH are overlapped.

In terms of a case where EPDCCH scheduling DCI and PDSCH are transmitted in a same subframe where the EPDCCH is not the scheduling DCI for the PDSCH scheduling DCI of the PDSCH is used for rate matching for the PDSCH instead of using EPDCCH in the same subframe. For the EPDCCH in the same subframe, even though it is scheduled for itself, the UE shall not assume rate matching of the PDSCH around the scheduled EPDCCH in the same subframe. In other words, a UE performs rate matching of PDSCH around only the scheduling DCI even with EPDCCH.

Additionally, the following cases are considered where a UE is configured with one or more (distributed) ePDCCH set. If scheduling DCI is scheduled via PDCCH i.e., in subframe where UE monitors PDCCH and PDSCHs referred by the cross-SF DCI may come in subframe configured to monitor ePDCCH. For Opt1, Opt2 and Opt3 are applicable per subframe basis. In other words, when PDSCH with DCI in the same SF comes in ePDCCH monitoring subframe, the assumption captured in each option is applied in the subframe. Or a UE is configured with ePDCCH set, regardless of where cross-SF scheduling DCI is transmitted (whether in PDCCH monitoring subframe or ePDCCH monitoring subframe), the Opt1, Opt2 and Opt3 may be applied. For example, if Opt2 is used with rate matching around the first ePDCCH set, regardless of subframe type, the same PRBs will be assumed to be rate matched. Whereas, if Opt4 is used, rate match in subframe configured to monitor ePDCCH for SPS PDSCH is not performed. If Opt5 is used, rate match in subframe configured to monitor ePDCCH for SPS PDSCH is not performed.

If scheduling DCI is scheduled via ePDCCH (i.e., in subframe where UE monitors ePDCCH) and (E)PDCCH-less PDSCH may come in subframe configured to monitor PDCCH. For all Options, PDSCH rate matching (if applicable) is considered in ePDCCH monitoring subframes, however, PDSCH rate matching around ePDCCH region in PDCCH monitoring subframe is not assumed. In other words, regardless of rate matching at ePDCCH monitoring subframes, rate matching in PDCCH monitoring around ePDCCH sets is not assumed. Or, the same PRB set is assumed to be rate matched per each option regardless of ePDCCH or PDCCH monitoring subframe. In other words, rate matched PRB set follows the rate matching pattern determined by activation/validation DCI scheduled PDSCH.

Further, both scheduling DCI and successive PDSCH are transmitted in ePDCCH monitoring subframes, for all options are applied in successive (E)PDCCH-less PDSCH transmissions.

Also the both scheduling DCI and successive PDSCHs are transmitted in PDCCH monitoring subframes, if Opt1 or Opt2 is assumed, in PDCCH monitoring subframes, the same assumption is applied. In other words, rate matching is performed around ePDCCH sets even in PDCCH monitoring subframes. Or, rate matching on Opt1 or Opt2 is applicable only in ePDCCH monitoring subframes. If Opt4 or Opt5 is used, rate matching is not assumed.

In other words, if rate matching is applied, two options are considered. Firstly, rate matching can be applied regardless of PDCCH or ePDCCH monitoring subframe and secondly, rate matching can be applied per subframe basis, it includes that it is applicable only to ePDCCH monitoring subframe.

As described, it can be assumed that the UE shall not assume rate matching around ePDCCH in PDCCH monitoring subframe and the UE shall assume rate matching around ePDCCH in ePDCCH monitoring subframe. Thus, rate matching pattern in ePDCCH monitoring subframe follows the most recent SPS PDSCH transmitted in ePDCCH subframe. Furthermore, rate matching can be configured per subframe by higher layer such that if a subframe is configured to perform rate matching around ePDCCH set, all PDSCH (scheduled by DCI or SPS) are rate matched around configured ePDCCHs.

Additionally, if a multi-subframe or cross-subframe scheduling is used when a UE configured to TM10, the UE assumes that rate matching on (E)PDCCH-less PDSCH is not performed regardless of subframe type and scheduling DCI via ePDCCH or PDCCH. Initial PDSCH scheduled by DCI would not be rate matched as well. Or, options listed above can be applied in TM10 regardless of subframe types whether ePDCCH or PDCCH monitoring subframe is the subframe types. For example, if rate matching is applied, it occurs in all subframes where (E)PDCCH-less PDSCHs are transmitted. Or, the Options listed above can be applied per subframe type according to configuration per serving cell.

Furthermore, PDCCH and EPDCCH monitoring behavior may be described more details, when a multi-SF (the subframe can be called as 'SF') or a cross-SF scheduling is configured, whether a UE shall monitor other EPDCCH or PDCCH could have multiple options depending on how the multi-SF or the cross-SF is configured.

If EPDCCH schedules a multi-SF DCI, regardless of EPDCCH monitoring subframe configuration, the UE shall monitor PDCCH including both CSS and USS in subframes which are scheduled by multi-SF or cross-SF DCI. For example, subframe n schedules a multi-SF PDSCHs over n, n+1, n+2, then UE shall monitor PDCCH in n+1 and n+2 regardless of EPDCCH monitoring subframe configuration. Mainly, this is to monitor uplink grant by PDCCH.

If EPDCCH schedules a multi-SF DCI, monitoring subframe will be kept as before. In EPDCCH monitoring subframe, the UE shall monitor EPDCCH and in PDCCH monitoring subframes which the UE monitors PDCCH. This invention notes to increase UE processing power, it is noted that if multi-SF DCI schedules multi-SF PDSCHs, a UE shall not expect to receive any DCI during multiple subframes which schedules another PDSCH in the same subframe. UE still can expect to receive uplink grant in those subframes. When the Uplink grant can be as an exception case, in this case, the UE can further monitor other subframes which are not configured for EPDCCH multi-SF scheduling.

The UE can perform an operation of blind decoding on (E)PDCCH. If a subset of subframes is predetermined to transmit multi-SF or cross-SF DCIs, other subframes may be considered as single-SF DCI capable subframes or no DCI capable subframes. While a UE is expecting to receive PDSCH, it is not assumed that UE will blind decode another downlink scheduling in the same subframe even in multi-SF or cross-SF capable subframes. Alternatively, multi-SF or cross-SF may be terminated at the subframes which are configured to be multi-SF or cross-SF capable subframes.

More details, multi-subframe or cross-subframe scheduling for uplink transmission is described. When Uplink grant can be scheduled by cross-SF DCI as well for multiple uplink transmissions and cross-subframe uplink transmissions (to handle scheduling limitation issue when such as uplink TDM is used and/or downlink TDM is used). In terms of multi-SF scheduling between downlink and uplink, multiple approaches can be considered.

As Alt1, a set of subframes which can schedule multi-subframe or cross-subframe for both downlink and uplink scheduling is fixed or can be higher-layer configured. For example, if subframe #0, #5, #9 is used for multi-SF or cross-SF scheduling, those subframes will be used for both uplink and downlink scheduling. In other subframes, the UE may not monitor EPDCCH or PDCCH at least for USS. For CSS, it can be configured to monitor different subframes, yet, it can be configured not to monitor any other subframe even for CSS as well. On other way, as Alt2, a set of subframes for multi-SF or cross-SF scheduling for downlink and uplink can be configured separately or EPDCCH monitoring subframe can be used for that or PDCCH USS monitoring subframe can be used for that, more specifically, each EPDCCH set may be configured to downlink and uplink scheduling for multi-SF respectively. The UE shall monitor EPDCCH or PDCCH for either downlink or uplink scheduling configured subframes. Or separate configuration for multi-SF may not be given as Alt3. In terms of DCI for multi-SF or cross-SF, either fixed number of multiple subframes that one DCI can schedule is given to a UE via higher layer or given in DCI with a dynamic indication.

For multi-subframe scheduling in TDD, for example, a TDD configuration is DSUUUDSUUU and a DCI in subframe #0 schedules PDSCHs for three subframes, multiple interpretations can be possible. Multi-SF PDSCHs is applied with successive downlink subframes are applicable. In this case, subframe #0, #1 and #5 are used for PDSCHs transmission. The same thing applies to uplink scheduling DCI. The supported uplink-downlink configurations are listed in Table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It may include that it is ignored different direction subframe and terminate multi-SF scheduling, if this is applied, only downlink subframes can be assumed for multi-SF scheduling. If there is no consecutive downlink subframes any longer, multi-SF will be terminated. In other words, in the example, multi-SF DCI will be applicable only to subframe #0 and #1. Since subframe #2 is uplink, it will be terminated. The same thing applies to uplink scheduling as well.

Also it includes changing the direction of subframe if multi-SF schedules multiple subframes more than consecutive downlink or uplink subframes. In this example, subframe #2 will be changed to downlink and then UE expects to receive PDSCH in subframe #2. This is a way of changing a subframe direction via multi-SF or cross-SF scheduling. The same thing applies to uplink as well. More specifically, power control for those subframes changed direction subframes can be separate from power control for normal subframes.

Further, it can be assumed to ignore special subframe as for a valid downlink or uplink subframe. Alternatively, validity can be determined based on the special subframe configuration (e.g., special subframe configuration 0, 5 with normal CP and 0, 4 with extended CP are not considered as valid downlink subframe nor uplink subframe) or based on the OFDM symbol for DwPTS or transmission mode (special subframe with transmission mode based on CRS can be considered as valid downlink subframe whereas special subframe without defined DM-RS pattern when a UE is configured with DM-RS based transmission mode such as TM9/10 is considered as invalid downlink subframe). Or, special subframe is considered always as valid downlink subframe where the eNB may not schedule PDSCH if special subframe cannot receive PDSCH by configuring multi-subframe DCI appropriately. In this case, special subframe may not be considered as a valid uplink subframe.

When eIMTA is configured along with multi-SF or cross-SF scheduling, interpretation of valid downlink can be based on (1) by fixed downlink subframe which is indicated as downlink subframes via SIB (2) by downlink subframe changed by DCI (3) downlink subframe referred by the reference HARQ-ACK DL/UL configuration. Each option has its own benefits and drawbacks. First approach offers the reliability regardless of dynamic DL/UL configuration change whereas all downlink subframes may not be utilized for multi-SF or cross-SF scheduling. Second approach offers the opposite benefit and drawback from (1). Third approach may allow a subframe which is not downlink subframe as downlink which may lead mis-function of the UE. Thus, it may not be desirable. However, a UE can monitor DCI in those subframes and can try to locate PDSCH in those subframes as well.

This embodiment notes that downlink subframe referred can be downlink subframe which has been changed from uplink or alternatively downlink subframes specified by SIB only. This may be determined based on UE capability to support flexible downlink/uplink subframe switch or not. Or, a UE can be configured by higher layer to take either approach.

Meanwhile, a collision between (E)PDCCH-less PDSCH and SPS-activated PDSCH is needed to define. When the number of subframes which can be scheduled without DCI by cross-subframe is fixed (e.g., 4), collision between (E)PDCCH-less PDSCH and SPS-activated PDSCH can happen. In this case, two alternatives can be considered, one way is handled that always (E)PDCCH-less PDSCH either by multi-SF or cross-SF scheduling has higher priority over SPS-activated PDSCH, the other way is handled that always SPS-activated PDSCH has higher priority over (E)PDCCH-less PDSCH. Or, a UE can be configured by higher layer which option to choose.

If the number of subframes are dynamically changing and indicated by cross-SF/multi-SF DCI, two options listed above can be applicable along with higher layer configuration to choose one option. Alternatively, if UE is capable, it is assumed that both (E)PDCCH-less PDSCH and SPS-activated PDSCH can be received by the UE at the same subframe. If this is supported, UE may signal to the eNB with the capability.

Moreover, a handling collision between multi-SF DCI and/or cross-SF DCI can be shown, when more than one DCIs scheduling the same PDSCH in a subframe collide, e.g., cross-SF DCI in n-th subframe scheduling DCI in n+9th subframe and cross-SF DCI in n+4-th subframe scheduling DCI in n+9th subframe collide, the most recent DCI can be assumed to be the valid one unless configured otherwise.

In TDD and/or FDD, if multi-subframe scheduling or cross-SF scheduling is used which schedules PDSCH/PUSCH in k subframes afterwards, e.g., nth subframe schedules PDSCH/PUSCH in n+1, n+2, n+3, and n+5, n+6, n+7 are for PUSCH, where k=1, 2, 3 or cross-subframe of k=3, i.e., n+3 subframe PDSCH/PUSCH (n+7 in PUSCH).

The applying subframes for this can be that the k is counted for the valid downlink or uplink subframes. In terms of counting, multiple approaches can be possible. It includes that it count only valid downlink or uplink subframe which can carry PDSCH regardless of subframe type, either legacy carrier type, flexible subframe, new carrier type or MBSFN. Or, it counts only valid downlink or uplink subframe which has the same type of subframe to the scheduling PDCCH contained subframe, either legacy carrier type, flexible subframe, new carrier type or MBSFN. It also includes that it counts only valid downlink subframe which is not MBSFN regardless of subframe type, or only valid downlink subframe which is not MBMS subframe regardless of subframe type. Further it counts only valid downlink or uplink subframes which is in the same EPDCCH set to the EPDCCH scheduling (E)PDCCH-less PDSCHs, e.g., if first EPDCCH set schedules multi-SF or cross-SF, count only subframes which is configured to be monitored for the first EPDCCH set. When counting, additionally, the MBSFN subframes or MBMS subframes can be excluded from the counting.

Further, it counts only valid downlink or uplink subframe which is configured to monitor EPDCCH sets if the cross-SF or multi-SF DCI is scheduled by EPDCCH. If it is scheduled by PDCCH, count only non-EPDCCH monitoring subframes. When counting, additionally, the MBSFN subframes or MBMS subframes can be excluded from the counting.

Also, it counts only valid downlink or uplink subframes which share the same QCL to the EPDCCH set where scheduling DCI is scheduled from (e.g., if EPDCCH set 1 configures multi-SF or cross-SF DCI, subframes QCL-ed with EPDCCH set 1 will be counted only or one or more set of subframes can be configured which indicates QCL relationship to either EPDCCH set or both). When counting, additionally, the MBSFN subframes or MBMS subframes can be excluded from the counting.

It includes that it counts only valid downlink or uplink subframes which does not include SPS-activated PDSCH or PUSCH scheduled and satisfy one or more rules mentioned in above, it includes that it counts only valid downlink or uplink subframes which are belonging to the same set of subframes configured. For example, a UE may be configured with one or more set of subframes where the scheduling (E)PDCCH can determine which set the multi-SF or cross-SF is applied. The number is counted only within the same set to the set which scheduling DCI is belonging to.

Also, this embodiment shows that the 'k' is considered as absolute value regardless of the number of valid downlink or uplink subframes. For example, k=3, n-th subframe schedules PDCCH, then n+3-th subframe will carry scheduled PDSCH regardless of actual valid downlink and uplink subframes in between.

A combination of Alt1 including the k is counted for the valid downlink or uplink subframes and Alt2 of the absolute value k, the combination k counts the downlink or uplink subframes regardless of type where multi-SF or cross-SF scheduling is terminated if k cannot be accomplished due to different type or direction. For example, if subframe #0 schedules a multi-SF with k=3, and subframe #3 is a MBSFN subframe, a UE shall terminate multi-SF scheduling at subframe #3 or treat the MBSFN subframe as if valid downlink subframe, e.g., TM9 PDSCH transmitted.

The same rule applies to other selection mechanism, e.g., if two sets are configured where odd subframes are the first set and even subframes are the second set and multi-SF schedules k=3 PDSCHs in even subframe, it shall be terminated at the first subframe or odd subframes within the next three subframes are considered to have the same characteristics to even subframes. For example, even subframes are new carrier type subframes and odd subframes are legacy type subframes, the UE shall assume n, n+1, n+2 subframes are all new carrier type subframes if multi-SF DCI is scheduled in n-th subframe with k=3.

Furthermore, a valid downlink subframe may not include any subframe which contains discovery signal and/or PSS/SSS and/or PMCH and/or paging.

This embodiment notes that new carrier type subframe refers to a subframe which has the PDSCH and/or EPDCCH starting OFDM symbol=0, and no cell specific RS is transmitted in the subframe. It may be expect for subframes which are preconfigured to transmit tracking RS. Also a flexible subframe refers to subframe type which may be similar to new carrier type where additionally a last few OFDM symbols, e.g., one or two are reserved for SRS transmission and others. It notes that starting OFDM symbol for PDSCH and/or EPDCCH in flexible subframe either can be assumed to be zero or given by higher layer signaling. A legacy carrier type subframe refers a subframe with CRS and PDCCH transmitted. In new carrier type, it is further assumed that PDCCH is not transmitted, whereas, a flexible subframe can carry PDCCH.

Moreover, it is noted that a UE can be configured with two sets of subframes where one set is considered as a normal subframe or full-power capable subframe or high MCS feasible subframes whereas the other set is considered as low-power subframes or low MCS feasible subframes. When a multi-SF or cross-SF scheduling is used which can be applied to both sets, e.g., odd subframes belong to the first set and even subframes belong to the second set and multi-SF DCI schedules four consecutive subframes, different MCS can be assumed. If the scheduling DCI is scheduled in normal subframe, MCS value in the second set can be determined MCS_signaled_in_DCI−delta, the delta is higher layer signaled. The power level can be determined with offset or separate power control. If DCI is scheduled in the second set subframes, MCS value for the first can be determined MCS_signaled_in_DCI+delta', here delta' can be higher layer signaled as well.

Furthermore, TPC command in uplink grant can be applicable over all subframes or each set. If TCP applies only to each set, the same set where DCI is transmitted is in effect. In terms of accumulation, either one-time application or iterative accumulation can be considered. The application mechanism also can be higher-layer configured. This embodiment notes that the number of sets can be extended to more than three in which case a UE may be configured with more parameters which differentiate each set from others.

A handling of retransmission for multi-SF or cross-SF scheduled (E)PDCCH-less PDSCHs can be applied to a retransmission of the whole multi-SF PDSCHs. Or it can be applied to retransmit only the NACK-ed PDSCHs by normal scheduling and/or cross-SF scheduling and/or multi-SF scheduling. If multi-SF is used, RV and/or NDI for each (E)PDCCH-less PDSCH may be signaled separately.

Related to retransmission, HARQ-process can be shared for (E)PDCCH-less PDSCHs scheduled by the same DCI or a separate HARQ process can be used per PDSCH. If separate HARQ process is assumed, HARQ process index is assumed to be increased in step of 1 per successive (E)PDCCH-less PDSCHs, e.g., if scheduling DCI uses HARQ proc ID=2, PDSCH in the same subframe uses HARQ proc ID=2 and PDSCH in the next valid downlink subframe uses HARQ proc ID=3 and so on. If separate HARQ process ID is used, the total number of multiple subframes that single DCI can schedule may not exceed the maximum number of HARQ processes that a UE can handle under the configuration. Also, it is up to eNB to make it sure the same HARQ process ID is used between two different multi-SF scheduling without NDI toggled, in other words, if the same HARQ process ID is used in the next multi-SF scheduling or single-SF scheduling, it should be accompanied with NDI toggled. Or, alternatively, a UE may assume that NDI is toggled if the same HARQ process ID is used for the next scheduling regardless of NDI field in DCI or a UE may assume that if NDI is not toggled, it is used for retransmission.

Activation and deactivation of multi-SF/cross-SF scheduling can be defined as followings. Instead of assigning the number of applicable subframes which one DCI can schedule PDSCH or PUSCH for, available approach is to assume the scheduling DCI as activation and until the UE is deactivated, the UE shall assume that successive PDSCH or PUSCH can be received or transmitted. In terms of deactivation, two approaches can be possible. One approach is to use a field in DCI (or a new field) which indicates whether DCI is for activation or deactivation. In other words, if the UE receives the second DCI (with the same content except for the activation/deactivation field), it shall assume that the multi-SF scheduling is terminated. Or, either by common channel such as PHICH, reinforcement of continuation of multi-SF can be considered. If the UE receives reinforcement indication, it shall assume multi-SF active state is remained. Otherwise, it shall assume it is terminated. Alternative option is to use scheduling DCI (downlink DCI or uplink grant) with resource allocation is configured to zero (i.e., no resource allocation is used) can be considered as a terminating command. Once a UE receives DCI with RA field configured to zero, it shall assume multi-SF or cross-SF scheduling is terminated. Note that instead of zero value RA, other fields can be used to create a "terminating" or 'dummy' (E)PDCCH. More specifically, the continuation or discontinuation can be limited to the set of subframes which are configured by higher layer to be used for multi-SF or cross-SF as a group.

Multiplexing of single-SF and cross-SF DCIs within the same subframe can be applied when a UE may expect to receive more than one downlink scheduling DCIs or uplink grants where at most one downlink scheduling DCI or uplink grant is single-SF, i.e., PDSCH is transmitted in the same subframe in USS and others can be cross-SF scheduling DCIs.

A set of subframes which can be used for multi-SF scheduling among small cells including enhanced ICIC can be exchanged. A set of subframes and/or PRBs where multi-SF DCIs can be scheduled can be exchanged among small cells so that necessary protection can be performed. If a UE is configured with rate matching around a set of PRBs which will be used for muting to protect other cell's control channel, using this information, eNB can further restrict the rate matching to a set of subframes where multi-SF control channels are transmitted. A UE thus can be configured with a set of subframes and a set of PRBs where rate matching is applied.

Alternatively, those resources can be transmitted with lower power compared to other PRBs. If new carrier type subframe is used, the power can be reduced for the RS as well as for the data. A UE can be configured with a power offset which is a power difference between normal downlink power and reduced power, or actual power values along with a set of PRBs and/or a set of subframes where lower power is used. If RS power is also reduced, no additional PDSCH-to-RE ratio needs to be given. Otherwise, a separate PDSCH-to-RE ratio for RS such as tracking RS, CRS or DM-RS may be given to the UE.

Furthermore, if new carrier type subframe is used with RNTP, two power limits that the eNB will use in the target PRB can be exchanged where power used with the presence of tracking RS and the other without tracking RS. The information about the set of subframes or the periodicity and/or subframe offset where tracking RS presents and the power level used without tracking RS, neighbor cell may select better PRBs and a set of EPDCCH monitoring subframe or a set of subframes used for multi-SF subframes can be selected. Alternatively, assuming a semi-static Relative Narrowband Transmit Power (RNTP) maybe a separate RNTP list from legacy RNTP is exchanged where new carrier type is used, the configured power can be assumed for transmitting tracking RS only where other cells may assume that transmission power on those semi-statically configured RNTP will be minimum power, e.g., zero if tracking RS and/or legacy PDCCH is not transmitted, or in OFDM symbol 2-14 of MBSFN subframes of the configuring cell.

When a semi-static RNTP can be configured, where semi-static RNTP can be used for a long-term protection needed channels or functions such as EPDCCH PRBs, RRM and/or RLM, with two power values (either by offset or values) where one is used with RS presence and the other is used without RS presence (or one with PDSCH and the other without PDSCH—if this is used, indication of presence of PDSCH may be signaled separately per subframe basis or PRB basis). Also assuming minimum power without tracking RS and assuming only tracking RS transmission in subframes with tracking RS (i.e., no PDSCH transmission in RNTP PRBs) can be applied. A constant power is configured by power value (only one value) regardless of MBSFN or non-MBSFN or TRS-subframe or non-TRS-subframe (same as legacy RNTP) for this embodiment. Applicable minimum power, e.g., OFDM symbol used for MBSFN region, new carrier type PDSCH region with assuming no PDSCH transmission nor EPDCCH transmission occurred on those configured RNTP PRBs is assumed.

Or, which option is used can be indicated by the cell and exchanged among cells. Alternatively, eNB can indicate whether RNTP PRBs will be muted or not (i.e., no PDSCH over those PRBs) along with carrier type (e.g., new carrier type, legacy carrier type). Additionally, a set of subframes where RNTP PRBs will be muted can be signaled. If new carrier type is used, necessary configuration information related to tracking RS periodicity, bandwidth, etc will be exchanged. If legacy carrier and new carrier type of subframes are multiplexed in a time-division manner, information related to TDM can be exchanged as well. Or, eNB may indicate that legacy carrier type is used all the time so that the worst assumption on semi-static RNTP PRBs can be used for selecting a set of PRBs for control channels by neighbor cells.

Overall, the goal is to reduce the interference as much as possible in configured RNTP PRBs and minimize the number of RNTP PRBs. Before exchanging this semi-static RNTP PRBs where PDSCH muting may be assumed or long-term guarantee of RNTP is assumed, each eNB may exchange the list of wanted PRB list where a set of PRBs which each eNB wants to utilize for control channels. Each eNB may send a different set of wanted PRB list to each neighbor cell depending on the interference level based on measurement such as eNB-to-eNB measurement. This may help the decision of selecting RNTP PRBs. A set of RNTP PRBs configured by neighbor cells can be used for multi-SF PDSCHs as well where interference level from neighbor cells can be kept below a certain threshold. Furthermore, a set of RNTP PRBs can be different per each neighbor cell.

Other impacts also are considered. A UE may be configured by higher layer to use multi/cross-subframe scheduling or single-subframe scheduling in all subframes. If it is not configured with a subset of subframes usable for multi/cross-subframe scheduling, a UE may assume that single-subframe scheduling is used by default. A UE may send the capability of supporting multi/cross-subframe scheduling or not.

Applying to CSS, a UE may expect to receive multi/cross-subframe scheduling DCIs for USS only. Alternatively, a UE can be configured with an option among both USS/CSS can be multi/cross-subframe scheduled, only USS can be multi/cross-subframe scheduled, or USS and EPHICH can be multi/cross-subframe scheduled. Only a few DCI formats can be multi/cross-subframe scheduled such as DCI1A, 2/2B/2C/2D, 3/3A, with variances of those DCI formats with field to support multi/cross-subframe scheduling, or only C-RNTI can be multi/cross-subframe scheduled, or only a few CNTIs can be multi/cross-subframe scheduled.

In handling of multi/cross-subframe DCI and single-subframe DCI, a UE may not expect to receive more than one PDSCHs scheduled by USS in a subframe or transmit more than one PUSCHs in a subframe. Thus, when a UE receives single-subframe scheduling DCI while in multi/cross-subframe DCIs in effect, single-subframe DCI shall override multi/cross-subframe scheduling DCI.

Figure 7:
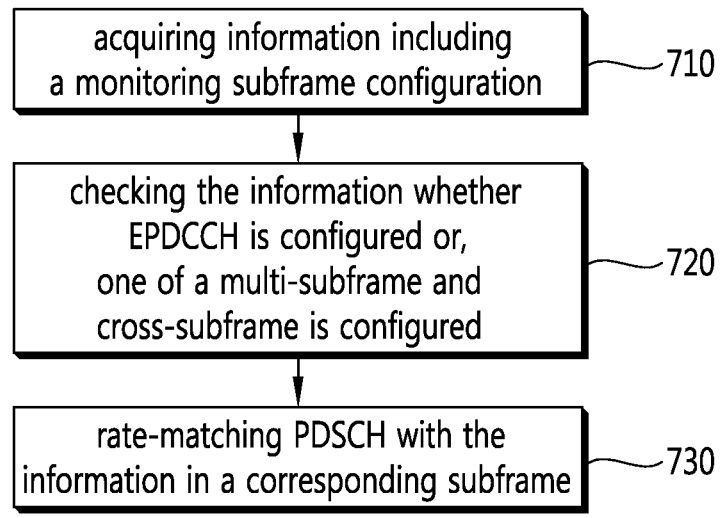
Figure 8:
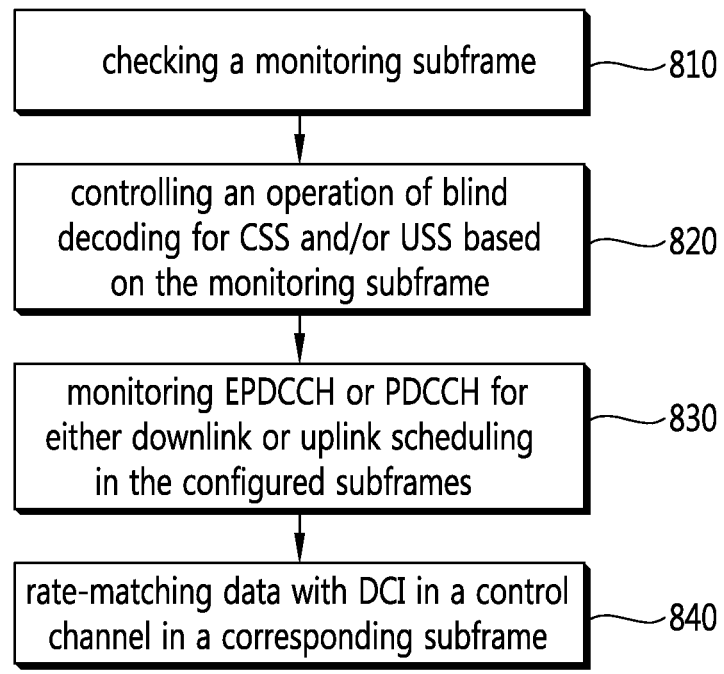
Figure 9:
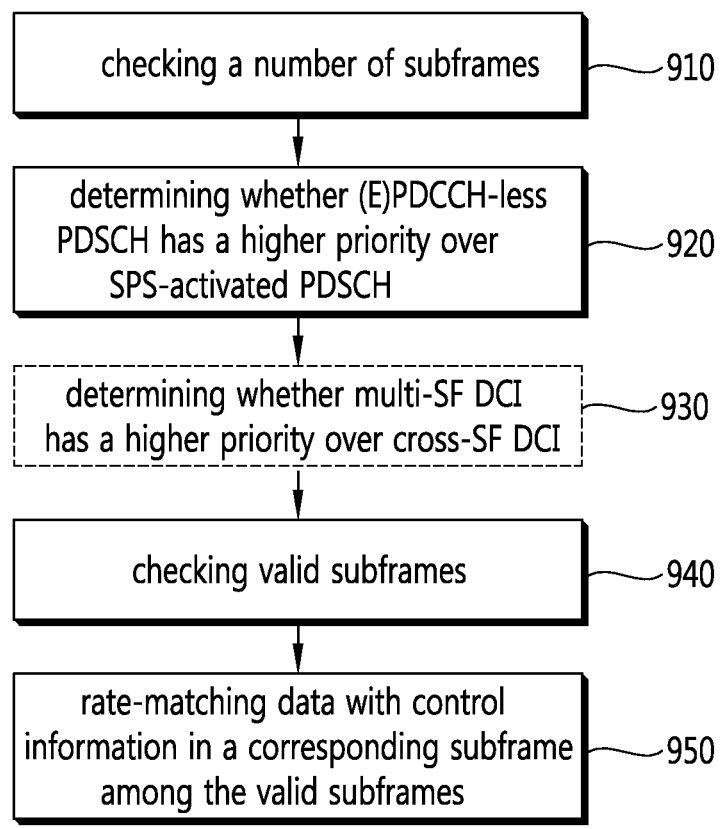

There are various flow charts of controlling an operation of rate matching which the present invention is applied in FIG. 7 to FIG. 9.

Referring FIG. 7, a UE acquires information including a monitoring subframe configuration, which is a set for subframes that control information are transmitted; the information includes a set of enhanced Physical Downlink Control Channel (ePDCCH) monitoring subframes or a set of Physical Downlink Control Channel (PDCCH) monitoring subframes. Wherein the monitoring subframe configuration for the control information is changed by a downlink (DL)/uplink (UL) configuration of a corresponding cell (710). Also the monitoring subframe configuration is changed according to a dynamic configuration for traffic adaptation. The UE checks the monitoring subframes of a cell based on the information and detects control information for the data transmission according to the monitoring subframes, wherein the UE checks that control information is configured with ePDCCH set, or one of a multi-subframe and a cross-subframe transmitting a Downlink Control Information (DCI) (720). The UE performs rate matching PDSCH in a corresponding subframe with checked the control information (730). Herein the UE checks different ePDCCH set based on the carrier type of the subframe and controls to monitor the subframe with a common search space (CSS) or a user-specific search space (USS) based on the ePDCCH set. Herein the information is acquired via one of a radio resource control (RRC) message including a subframe configuration including EPDCCH set, a different Time Division Duplex (TDD) configuration, a medium access control (MAC) message; or a system information message.

Also, referring FIG. 8, the UE may acquire information including a monitoring subframe configuration, which is a set for subframes that control information are transmitted; the information includes a set of enhanced Physical Downlink Control Channel (ePDCCH) monitoring subframes or a set of Physical Downlink Control Channel (PDCCH) monitoring subframes. Wherein the monitoring subframe configuration for the control information may be changed by a downlink (DL)/uplink (UL) configuration of a corresponding cell (810). Also the monitoring subframe configuration is changed according to a dynamic configuration for traffic adaptation. Herein the information is acquired via one of a radio resource control (RRC) message including a subframe configuration including EPDCCH set, a different Time Division Duplex (TDD) configuration, a medium access control (MAC) message; or a system information message.

And then the UE controls an operation of blind decoding for controlling to monitor the subframe with a common search space (CSS) or a user-specific search space (USS) based on the ePDCCH set or PDCCH set of the monitoring subframes (820).

The UE monitors EPDCCH or PDCCH to check control information for either downlink or uplink scheduling in the configured subframes (830). The UE performs rate matching PDSCH data in a corresponding subframe with the checked control information (840).

Further, referring FIG. 9, the UE may acquire a number of subframes which are scheduled without control information (910). The UE checks that (E)PDCCH less PDSCH has a higher priority over SPS-activated PDSCH (920). The UE can receive a signal including the higher priority information from the network. The information includes a set of enhanced Physical Downlink Control Channel (ePDCCH) monitoring subframes or a set of Physical Downlink Control Channel (PDCCH) monitoring subframes. Also the information includes a multi-subframe or a cross-subframe to be configured to transmit a Downlink Control Information (DCI). Further the UE can determine whether a multi-subframe DCI has a priority over a cross-subframe DCI (930).

And the UE determines a valid subframe among the number of subframes to be applied with the predetermined control information (940), and rate matches data in the valid subframe with the predetermined control information (950). Wherein the predetermined control information is configured in order of priority of cross-subframe scheduling or multi-subframe scheduling with an ePDCCH set, or a Semi-Persistent Scheduling (SPS), the valid subframe is changed by a carrier type of the subframe. The priority of control information is indicated from the network with predefined signal, the signal can be a RRC signal or SIB, Scheduling DCI.

Figure 10:
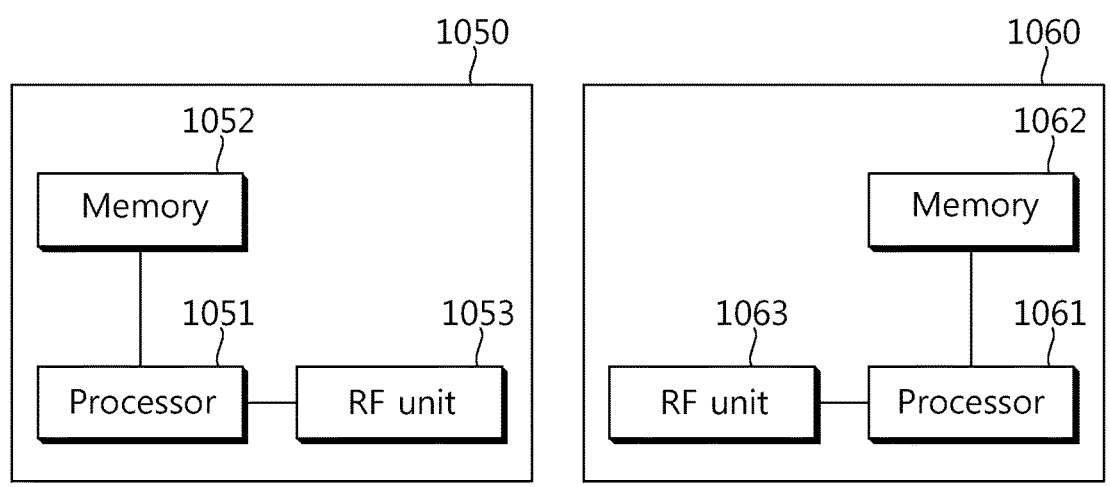
FIG. 10 shows a block diagram showing a wireless communication system according to an exemplary embodiment of the present invention.

FIG. 10 is a block diagram showing a wireless communication system according to an embodiment of the present invention.

A BS 1050 includes a processor 1051, a memory 1052, and a radio frequency (RF) unit 1053. The memory 1052 is coupled to the processor 1051, and stores a variety of information for driving the processor 1051. The RF unit 1053 is coupled to the processor 1051, and transmits and/or receives a radio signal. The processor 1051 implements the proposed functions, procedures, and/or methods. In the embodiments of FIG. 1 to FIG. 9, the operation of the BS can be implemented by the processor 1051.

Especially, the processor 1051 may configure one or more cells with different frequencies, for this invention the processor 1051 configures the cells to support Semi-Persistent Scheduling, TTI-bundling, HARQ-ACK procedures. The processor 1051 may configure and transmit a configuration including a small cell as a relay node, the information related to the relay node (e.g., cell ID, scheduling information, etc) to the UE so that the UE can properly receive the data from the relay node. It also includes ACK/NACK subframe configuration for the data transmission.

Also the processor 1051 may configure synchronization information including a set of subframes in which a discovery signal or a synchronization signal is transmitted or not per radio frame, and a subframe pattern which is changed according to a downlink (DL)/uplink (UL) configuration of a corresponding cell, the subframe configuration includes bitmap information to indicate the LCT subframe and the NCT subframe is configured for the cells or shared the between the macro cell and one of the small cells to perform the synchronization. And then processor 1051 may configure the subframe pattern for monitoring a discovery signal or synchronization signal of performing a network sync-up.

When the processor 1051 configures information including a monitoring subframe configuration, which is a subset of subframes including that control information are transmitted, the configuration includes control information for a carrier type of a subframe so the UE determines whether a subframe is in the monitoring subframes for control information or not, and controls blind decoding based on the monitoring subframes information.

The processor 1051 can configure control information in view of cell on/off to save the UE's energy saving with DRX configuration so the UE checks the monitoring subframe configuration that the pattern is changed by having the LCT and NCT types, a (E)PDCCH set related to multi-subframe DCI or a cross-subframe DCI, SPS PDSCH, it can be also signaled to the UE to perform the better cell monitoring and data transmission. The information of the subframe pattern having the LCT and NCT types is configured by RRC configuration, Scell configuration, or TM mode configuration. Or, when those configurations are already set in the node in UE, the information including an indication to operate a specific cell is indicated by L1 signaling.

The processor 1051 can perform data transmission via the selected subframe, also configure CRS or PSS/SSS each, the CRS patterns includes a start subframe, subframe set, and RB of the CRS with the RRC configuration in a radio frame. Further the processor 1051 may configure proper a dynamic TDD configuration for traffic adaptation.

The wireless device 1060 includes a processor 1061, a memory 1062, and an RF unit 1063. The memory 1062 is coupled to the processor 1061, and stores a variety of information for driving the processor 1061. The RF unit 1063 is coupled to the processor 1061, and transmits and/or receives a radio signal. The processor 1061 implements the proposed functions, procedures, and/or methods. In the embodiments of the FIG. 1 to FIG. 9, the operation of the UE can be implemented by the processor 1061.

Especially, the processor 1061 may configure one or more cells with different frequencies, for this invention the processor 1061 configures the cells to support Semi-Persistent Scheduling, TTI-bundling, HARQ-ACK procedures. The processor 1061 may configure and receive a configuration of serving cells including a macro cell and a small cell as a relay node, the information related to the relay node (e.g., cell ID, scheduling information, etc) supports that the UE can properly receive the data from the relay node of the small cell and the macro cell. It also includes ACK/NACK subframe configuration for the data transmission. The processor 1061 may also calculate ACK/NACK timing after receiving the data based on the ACK/NACK subframe configuration.

Also the processor 1061 may configure synchronization information including a set of subframes in which a discovery signal or a synchronization signal is transmitted or not per radio frame, and a subframe pattern which is changed according to a downlink (DL)/uplink (UL) configuration of a corresponding cell, the subframe configuration includes bitmap information to indicate the LCT subframe and the NCT subframe is configured for the cells or shared the between the macro cell and one of the small cells to perform the synchronization. And then processor 1061 may configure the subframe pattern for monitoring a discovery signal or synchronization signal of performing a network sync-up.

When the processor 1061 configures information including a monitoring subframe configuration, which is a subset of subframes including that control information are transmitted, the configuration includes control information for a carrier type of a subframe so the UE determines whether a subframe is in the monitoring subframes for control information or not, and controls blind decoding based on the monitoring subframes information.

The processor 1061 can configure control information in view of cell on/off to save the UE's energy saving with DRX configuration so the UE checks the monitoring subframe configuration that the pattern is changed by having the LCT and NCT types, a (E)PDCCH set related to multi-subframe DCI or a cross-subframe DCI, SPS PDSCH, it can be also signaled to the UE to perform the better cell monitoring and data transmission. The information of the subframe pattern having the LCT and NCT types is configured by RRC configuration, Scell configuration, or TM mode configuration. Or, when those configurations are already set in the node in UE, the information including an indication to operate a specific cell is indicated by L1 signaling.

The processor 1061 can perform data transmission via the selected subframe, also configure CRS or PSS/SSS each, the CRS patterns includes a start subframe, subframe set, and RB of the CRS with the RRC configuration in a radio frame. Further the processor 1051 may configure proper a dynamic TDD configuration for traffic adaptation.

Also, processor 1061 can check a number of subframes which is scheduled without control information for the data transmission; determine a valid subframe among the number of subframes to be applied with predetermined control information; and rate match data in the valid subframe with the predetermined control information. The processor 1061 can check the predetermined control information is configured in order of priority of cross-subframe scheduling or multi-subframe scheduling with an ePDCCH set, or a Semi-Persistent Scheduling (SPS), the priority of the control information scheduling is changed by a signal from a network, the valid subframe is changed by a carrier type of the subframe.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for controlling data transmission in a wireless communication system, performed by user equipment (UE), the method comprising:
   checking a number of subframes which are scheduled without control information for the data transmission;
   determining whether a multi-subframe downlink control information (DCI) has a priority over a cross-subframe DCI;
   determining a valid subframe among the number of subframes to be applied with predetermined control information; and
   rate matching data in the valid subframe with the predetermined control information,
   wherein the predetermined control information is configured in order of priority of cross-subframe scheduling or multi-subframe scheduling with an ePDCCH set, or a Semi-Persistent Scheduling (SPS), and
   the priority of the control information scheduling is changed by a signal from a network, the valid subframe is changed by a carrier type of the subframe.

2. The method of claim 1, wherein the signal includes information on a set of enhanced Physical Downlink Control Channel (ePDCCH) monitoring subframes, or a set of Physical Downlink Control Channel (PDCCH) monitoring subframes.

3. The method of claim 1, wherein the signal includes information on a multi-subframe or a cross-subframe which is configured to transmit a Downlink Control Information (DCI).

4. The method of claim 3, wherein the signal further includes information on a set of subframes for which the multi-subframe or the cross-subframe for both downlink and uplink scheduling is fixed or, a set of subframes for which the multi-subframe or the cross-subframe for downlink and uplink is configured separately.

5. The method of claim 1, wherein the signal includes Time Division Duplex (TDD) configuration including downlink and uplink scheduling for the data transmission,
   wherein the TDD configuration is indicated with an index, and the TDD configuration is changed by downlink and the uplink subframe with a dynamic TDD configuration for traffic adaptation.

6. The method of claim 1, wherein the signal includes information for data subframes which are applied with the control information.

7. The method of claim 1, wherein the signal is one of:
   a radio resource control (RRC) message including an ePDCCH set, which contains a scheduling Downlink Control Information (DCI) or Semi-Persistent Scheduling (SPS) configuration; or
   a control channel including a Physical Downlink Control Channel (PDCCH) or ePDCCH having a scheduling DCI.

8. The method of claim 1, wherein the signal includes Physical Resource Block (PRB) set including a rate matching pattern determined by whether activation or validation is indicated on a DCI scheduled for a Physical Downlink Shared (PDSCH).

9. A wireless device for controlling data transmission in a wireless communication system, the wireless device comprises:
- a radio frequency (RF) unit for transmitting and receiving a radio signal; and
- a processor operatively coupled to the RF unit that:
- checks a number of subframes which are scheduled without control information for the data transmission;
- determines whether a multi-subframe downlink control information (DCI) has a priority over a cross-subframe DCI;
- determines a valid subframe among the number of subframes to be applied with predetermined control information; and
- rate matches data in the valid subframe with the predetermined control information,
- wherein the predetermined control information is configured in order of priority of cross-subframe scheduling or multi-subframe scheduling with an ePDCCH set, or a Semi-Persistent Scheduling (SPS), and
- the priority of the control information scheduling is changed by a signal from a network, the valid subframe is changed by a carrier type of the subframe.

10. The wireless device of claim 9, wherein the signal includes at least one of:
- information on a set of enhanced Physical Downlink Control Channel (ePDCCH) monitoring subframes, or a set of Physical Downlink Control Channel (PDCCH) monitoring subframes,
- information on a multi-subframe or a cross-subframe which is configured to transmit a Downlink Control Information (DCI),
- a Time Division Duplex (TDD) configuration including downlink and uplink scheduling for the data transmission, the TDD configuration is indicated with an index, and the TDD configuration is changed by the downlink and the uplink subframe with dynamic Time Division Duplex (TDD) configuration for traffic adaptation,
- information for data subframes which are applied with the control information, and
- a Physical Resource Block (PRB) set including a rate matching pattern determined by activation/validation on a DCI scheduled for a Physical Downlink Shared (PDSCH).

11. The wireless device of claim 9, wherein the signal is one of: a radio resource control (RRC) message including an ePDCCH set, which contains a scheduling Downlink Control information (DCI) or Semi-Persistent Scheduling (SFS) configuration; or a control channel including a Physical Downlink Control Channel (PDCCH) or ePDCCH having a scheduling DCI.

* * * * *